United States Patent [19]

Creigh et al.

[11] Patent Number: 5,048,055
[45] Date of Patent: Sep. 10, 1991

[54] MULTI-DATA RATE SELECTABLE EQUALIZER

[75] Inventors: John L. Creigh; Jerry Dagher, both of Raleigh; James W. Sylivant, Apex, all of N.C.

[73] Assignee: International Business Machines Corporation, Armonk, N.Y.

[21] Appl. No.: 485,206

[22] Filed: Feb. 26, 1990

[51] Int. Cl.$^5$ .............................................. H04B 3/14
[52] U.S. Cl. ........................................ 375/11; 370/84; 333/18
[58] Field of Search ..................... 375/12, 14, 121, 11; 370/84, 97; 379/394, 414, 398; 333/18; 364/514

[56] References Cited

U.S. PATENT DOCUMENTS

| | | | |
|---|---|---|---|
| 3,649,916 | 3/1972 | Winters | 375/12 |
| 3,868,576 | 2/1975 | Bagdasarjanz et al. | 333/18 |
| 4,245,320 | 1/1981 | Desblache | 365/514 |
| 4,555,788 | 11/1985 | Merrill | 375/11 |
| 4,621,355 | 11/1986 | Hirosaki et al. | 375/12 |
| 4,759,035 | 7/1988 | McGary et al. | 333/18 |
| 4,887,280 | 12/1989 | Reisenfeld | 375/121 |

Primary Examiner—Stephen Chin
Attorney, Agent, or Firm—John B. Frisone

[57] ABSTRACT

An equalizer circuit suitable for selectively equalizing a transmission media operating at one of a number of different data rates has a number of equalizers, one for each data rate, connected in parallel to the media and a selectively operable means for disabling all but one of the equalizers.

5 Claims, 3 Drawing Sheets

MULTI-DATA RATE SELECTABLE EQUALIZER

This invention relates to equalizers for use with data signal transmission media and, more particularly, with equalizers which will equalize a transmission media over which one of a plurality of data signals having different data rates are selectively transmitted.

BACKGROUND

The IEEE 802.5 Token Ring Local Area Network uses a balanced twisted pair wire for data transmission. In the system data is transmitted using an encoding technique known as differential Manchester encoding. As the signal travels down the twisted pair, it undergoes phase and amplitude distortion which varies with the length of the transmission line and the data rate. This distortion gives rise to intersymbol interference and may be corrected by using an equalizer circuit located at the receiving end. FIG. 1 illustrates a prior art equalization circuit suitable where a single data rate is employed. The equalizer has a pair of input terminals 11 and a pair of output terminals 12. A differential amplifier/filter including a pair of transistors 14 and 15 provides an output at the pair of terminals 12 which is a function of the differential input applied at the pair of input terminals 11. A pair of constant current sources 16 and 17 regulate the total current through transistors 14 and 15. The frequency response and group delay characteristics for small signals can be tailored by selection of a suitable impedance Z. (Voltage transfer from input to output=2*RL/Z) As the input signals gets larger, corresponding to shorter lengths of transmission line, the transfer function from input to output becomes non-linear and reduces the amount of frequency and group delay correction. When the input signal at the pair of input terminals 11 is sufficiently large, the collector current through transistor 14 is cut off. Current flowing through transistor 15 will flow through impedance 18 and current source 16 as well as current source 17. Conversely, when the collector current through transistor 15 is cut off, current flowing through transistor 14 will flow through impedance 18 and current source 17 as well as through current source 16. This circuit is inserted in the data path at the receiver.

If the transmission media, that is the twisted pair used to carry signals between stations, is to carry signals having different data rates at diffferent times, the equalizer illustrated in FIG. 1 cannot cope with different data rates such as 4 or 16 megabits. A pair of equalizers each suitable for equalizing the line for the different data rates will be required. FIGS. 2 and 3 show early attempts at solving the problem by providing two equalization circuits. In FIG. 2 the signal from the input is applied to a first equalizer 1 and a second equalizer 2 and an electronic analog switch is used to select one or the other equalizer. In the equalizer of FIG. 3, two impedances $Z_1$ and $Z_2$ are selected depending upon the data rate of the signal applied to the transmission media. $Z_1$ is selected, for example, to compensate the transmission media for a 4 megabit data rate while $Z_2$ will be selected to compensate the transmission media for a signal at a 16 megabit rate.

The circuits illustrated om FIG. 2 and FIG. 3 are potential solutions to the equalization of multi-data rate transmission systems. However, for reasons which will be explained below, neither of these circuits is desirable.

The obvious disadvantage of the circuit illustrated in FIG. 2 is the duplication of components and the additional space required for providing multiple equalizers. A second disadvantage is the possibility of feedthrough of unwanted signal from the deselected equalizer. The extent of the feedthrough would depend entirely on the type of switch used. If a relay is used, the open contacts must have very little capacitance across them. Capacitance as small as 1 pico-farad could allow excessive feedthrough of unwanted signals. This low value of capacitance is not difficult to achive with relay contacts. However, relay contacts have other disadvantages such as requiring power for operating the coil and requiring a large amount of area on circuit boards, etc. Analog switches used as an alternative have unique problems of their own. While they solve the space problem, they have electrical characteristics which are undesirable. They have a relatively large series resistance (50-100 ohms) for closed switches and large capacitances (substantially greater that 1 pico-farad) for open switches. These characteristics add undersirable signal distortion and allow excessive feedthrough of unwanted signals. In additon, there is excessive capacitive coupling between different switches fabricated on a single chip.

SUMMARY OF THE INVENTION

The invention contemplates an equalizer circuit which can selectively equalize transmission media to which it is connected which is used for selectively conveying signals at one or one more data rate. The equalizer circuit includes a plurality of equalizers each adapted for connection to the transmission medium and arranged to equalize the transmission medium for signals at a different one of the more than one different data rates. Each of the equalizers includes a controllable means having a first state in which the equalizer is operative and a second state in which the equalizer is inoperative. Means are provided for selectively controlling a single means associated with one of the equalizers to a first state and the remaining means to the second state whereby the transmission media is equalized only by the equalizer associated with the means controlled to the first state and all of the other equalizers remain in the inoperative state.

DETAILED DESCRIPTION OF THE INVENTION

Figure 1:
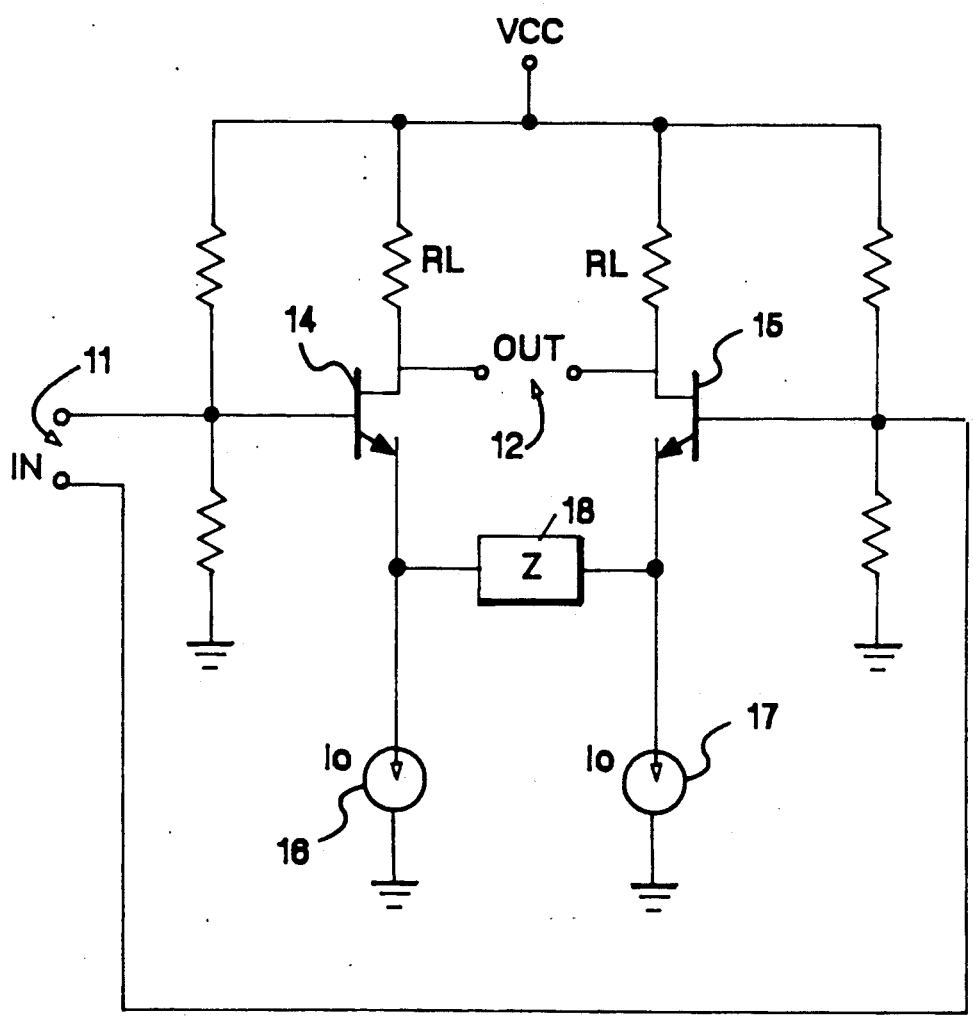
FIG. 1 is a circuit diagram of a prior art equalizer suitable for equalizing a transmission media operating at a single data rate.
Figure 2:
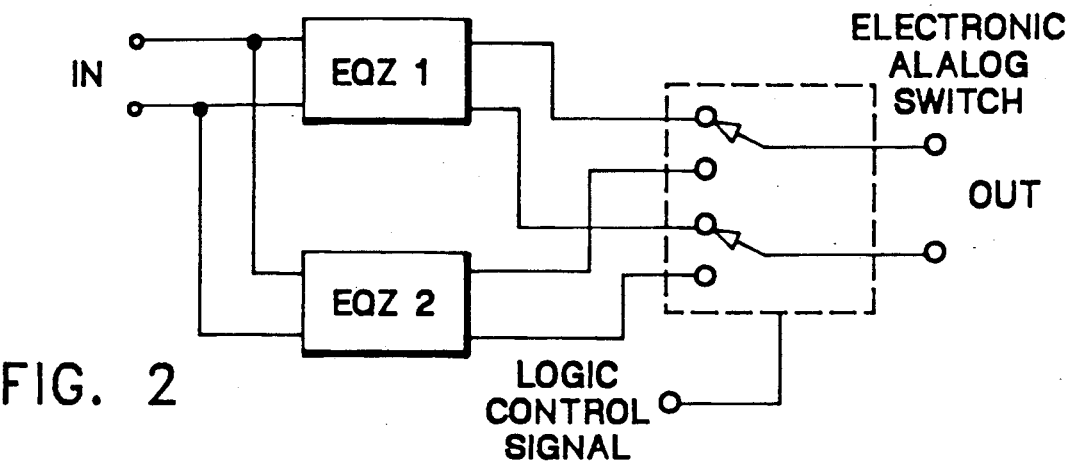
FIGS. 2 and 3 are circuit diagrams of early attempts which proved to be unsatisfactory at the data rates used in the contemplated application; and, FIG. 4 shows a circuit diagram of a multiple equalizer constructed according to the invention.
Figure 3:
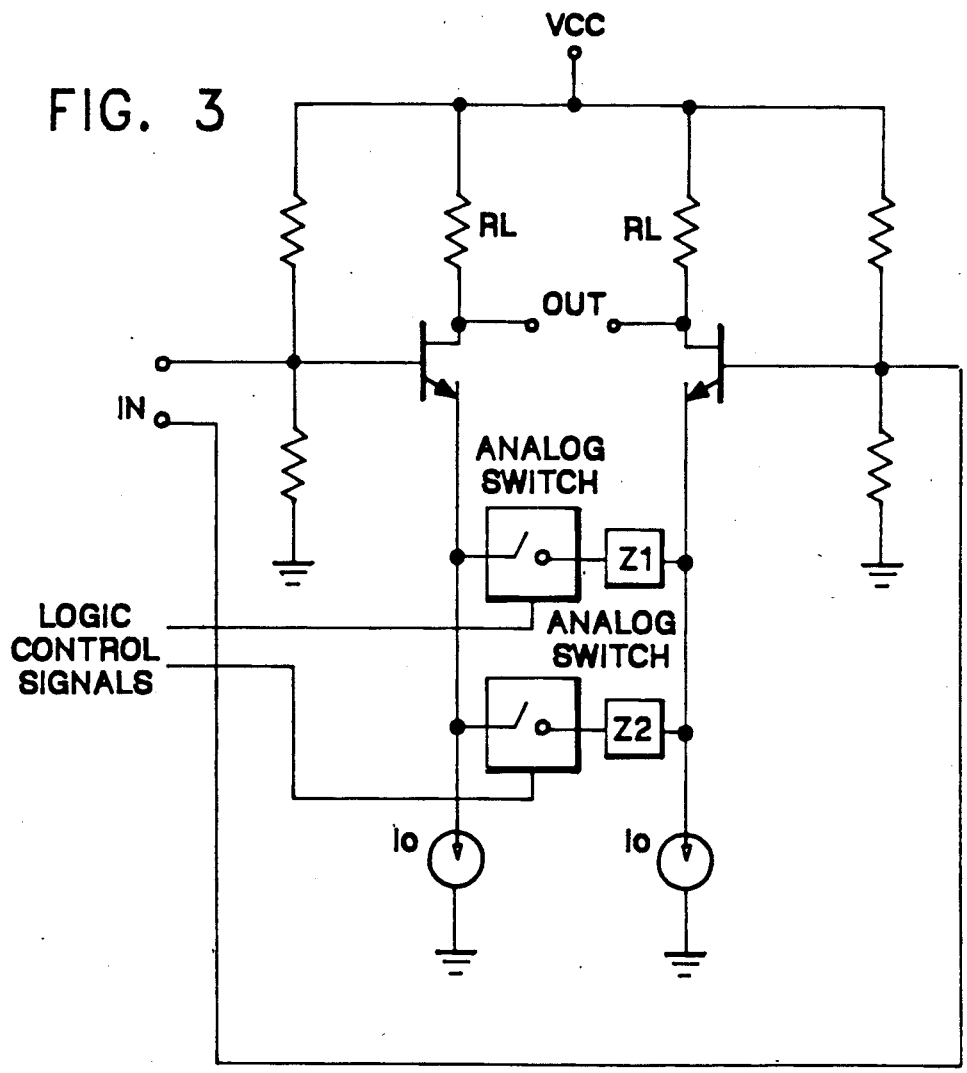
Figure 4:
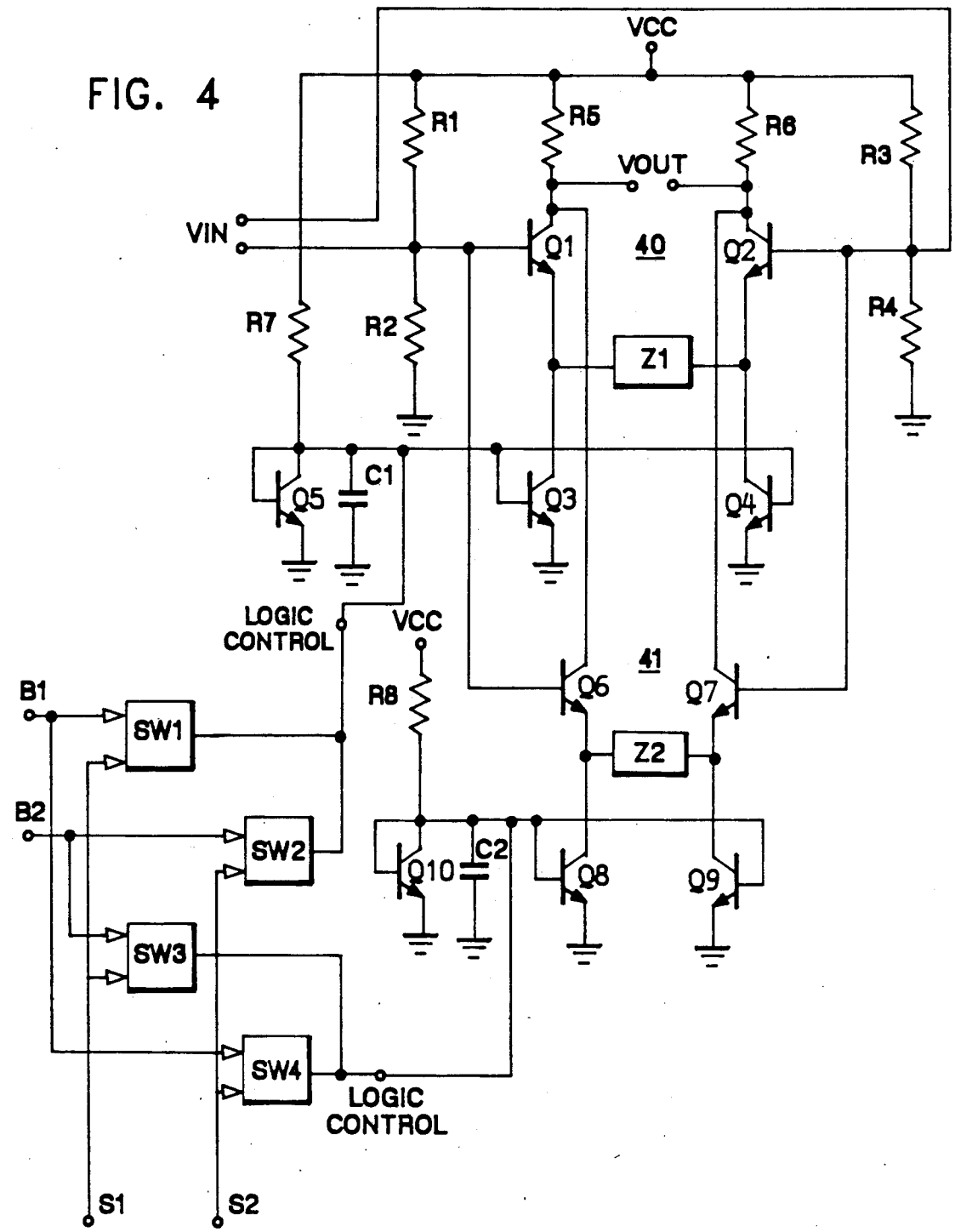

The circuit illustrated in FIG. 4 utilizes a plurality of equalizers 40 and 41 which are similar in some respects to the single equalizer illustrated in FIG. 1. Equalizer 40 includes a pair of transistors $Q_1$ and $Q_2$ having their collectors connected to Vcc by resistors $R_5$ and $R_6$ respectively. The emitters of $Q_1$ and $Q_2$ are connected to ground through controlled constant current sources $Q_3$ and $Q_4$. The bases of $Q_1$ and $Q_2$ are connected to the input terminals (Vin) and the collectors are connected to the output terminals. (V out). A pair of resistors $R_1$ and $R_2$ provide bias voltage to the base of $Q_1$ while resistors $R_3$ and $R_4$ provide bias voltage to the base of $Q_2$. An impedance $Z_1$, selected to equalize the transmission media at a given data rate, is connected between the emitters of $Q_1$ and $Q_2$.

In the prior art circuit, transistors $Q_3$ and $Q_4$ are permanently biased on which is not the case for the equalizer illustrated in FIG. 4. In this novel circuit, a transistor $Q_5$ has its collector connected to its base and to Vcc via $R_7$. Current flows from Vcc through $R_7$ and the base emitter of $Q_5$. $Q_3$ and $Q_4$ are connected to $Q_5$ and together form mirrored current sources for $Q_1$ and $Q_2$. By applying an appropriate control volage ($B_1$) to the bases of $Q_3$, $Q_4$ and $Q_5$, the current sources $Q_3$ and $Q_4$ can be gated off. When these current sources are not gated to the off or inoperative state, the transistors $Q_1$ and $Q_2$ along with impedance $Z_1$ act as a differential amplifier/filter and provide an output at Vout that is dependent on the input at Vin. When the current sources are selected to the off or inoperative state, no current flows and no voltage is present at Vout as a result of the action of equalizer 40. Capacitor $C_1$ prevents any switching noise from modulating the current sources and degrading the output signal.

Equalizer 41 is identical to equalizer 40 and shares Vcc, Vin, Vout and $R_{1-6}$. It is connected in parallel with equalizer 40 to Vin, Vout and Vcc and the shared biasing resistors. A significant difference is the provision of a separate current source control provided by $Q_{10}$ and $R_8$ which allows the individual current sources to be individually controlled. Of course the impedance $Z_2$ of equalizer 41 is selected to equalize the transmission media at a different data rate.

Switches $SW_1$ and $SW_2$ under control of selection signals $S_1$ and $S_2$ apply bias voltage $B_1$ (typically 0 volts) to the base of transistors $Q_{3-5}$ and $Q_{8-10}$. In the illustrated embodiment, current sources $Q_3$ and $Q_4$ will be on or operative when sources $Q_8$ and $Q_9$ are off or inoperative and visa versa.

When the $Q_3$ and $Q_4$ current mirrors are on the $Q_8$ and $Q_9$ current mirrors are off, the signal path through $Q_6$ and $Q_7$ is blocked since the base collector junctions of $Q_6$ and $Q_7$ are reversed biased which makes the base collector capacitance a fraction of a pico-farad. Such a small capacitance allows only a negligible feed-through. With the path through $Q_6$ and $Q_7$ blocked, the equalizer characteristics are determined by $Z_1$ only. When the control signals are reversed, mirrored current sources $Q_3$ and $Q_4$ are off and mirrored current sources $Q_8$ and $Q_9$ are on. This will block the signal path through $Q_1$ and $Q_2$ and the path through $Q_6$ and $Q_7$ will allow $Z_2$ only to determine the equalizer characteristics.

If more than two data rates are to be accommodated, then additional equalizers must be connected in parallel with equalizers 40 and 41 and the switching circuit expanded whereby the current sources of the desired equalization $Z_i$ is turned on or rendered operative while the remaining current sources ($Z_1 \ldots Z_{i-1}, Z_{i+1} \ldots Z_n$) are turned off or rendered inoperative.

We claim:

1. An equalizer circuit for selectively equalizing a transmission media used for selectively conveying signals at one of more than one data rate comprising:
    a plurality of equalizers adapted for connection to said transmission media and each arranged to equalize the transmission media for signals at a different one of said more than one different data rates;
    each said equalizer including a controllable means having a first state in which the equalizer is operative and a second state in which the equalizer is inoperative; and,
    means for selectively controlling a single controllable means to the first state and the remaining controllable means to the second state whereby the transmission media is equalized by the equalizer associated with the controllable means controlled to the first state.

2. An equalizer circuit as set forth in claim 1 in which the controllable means includes a constant current source which is on in the said first state and off in the said second state.

3. An equalizer circuit as set forth in claims 1 or 2 in which each said plurality of equalizers includes a differential amplifier/filter having and input and an output, and means for connecting the inputs in parallel and the outputs in parallel.

4. An equalizer circuit as set forth in claim 1 in which each said plurality of equalizers includes a differential amplifier/filter responsive to the signals on the transmission media and a controllable constant source for enabling the differential amplifier/filter when turned on and disabling the differential amplifier/filter when turned off.

5. An equalizer circuit as set forth in claim 4 in which each differential amplifier/filter includes an input and an output, and means for connecting the inputs in parallel to the transmission media and connecting the outputs in parallel with each other.

* * * * *